(12) United States Patent
Lin

(10) Patent No.: US 8,633,798 B2
(45) Date of Patent: Jan. 21, 2014

(54) COMPUTER SYSTEM WITH SECURITY APPARATUS

(75) Inventor: Yu-Sheng Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 252 days.

(21) Appl. No.: 13/271,250

(22) Filed: Oct. 12, 2011

(65) Prior Publication Data

US 2013/0027179 A1  Jan. 31, 2013

(30) Foreign Application Priority Data

Jul. 28, 2011 (TW) .............................. 100126718 A

(51) Int. Cl.
*G05B 19/00* (2006.01)

(52) U.S. Cl.
USPC ............. 340/5.53; 340/5.2; 340/5.3; 340/5.5; 340/5.8; 380/248; 380/249; 380/250; 382/116; 382/124; 455/411; 711/164; 713/182; 713/186; 713/300; 726/9; 726/20; 726/28; 726/36

(58) Field of Classification Search
USPC ............... 340/5.2, 5.3, 5.31, 5.51, 5.52, 5.53, 340/5.54, 5.63, 5.8, 5.81, 5.82, 5.83, 6.1, 340/5.74, 5.6, 5.61, 5.62, 5.64, 5.65, 5.22, 340/5.25; 380/248, 249, 250; 382/116, 124; 455/411; 711/164, 182, 186, 300; 713/182, 186, 300; 726/9, 20, 27, 28, 726/36
See application file for complete search history.

(56) References Cited

U.S. PATENT DOCUMENTS

| 7,260,726 B1 * | 8/2007 | Doe et al. ...................... 713/189 |
| 2002/0095608 A1 * | 7/2002 | Slevin .......................... 713/202 |

\* cited by examiner

*Primary Examiner* — Daniel Wu
*Assistant Examiner* — Benyam Haile
(74) *Attorney, Agent, or Firm* — Altis Law Group, Inc.

(57) ABSTRACT

A computer system includes a computer, a fingerprint reader, and a security apparatus to apply complete security for the benefit of an authorized user. The computer includes a first interface, a second interface, an account storage unit, and a fingerprint storage unit. The fingerprint reader can connect with the computer through the first interface for inputting fingerprint information. The security apparatus can connect with the computer through the second interface, and includes a password storage module, a first use module, a password modification module, and a normal use module.

17 Claims, 7 Drawing Sheets

COMPUTER SYSTEM WITH SECURITY APPARATUS

BACKGROUND

1. Technical Field

The present disclosure relates to a computer system, and particularly, to a computer system with a security apparatus.

2. Description of Related Art

Confidential information which is stored in a computer is often secured by a password. However, a computer system protected only by a password may be cracked with ease.

Therefore, what is needed is a computer system with a more sophisticated security apparatus that overcomes the above-mentioned problem.

BRIEF DESCRIPTION OF THE DRAWINGS

The components in the drawings are not necessarily drawn to scale, the emphasis instead being placed upon clearly illustrating the principles of a computer system with a security apparatus. Moreover, in the drawings, like reference numerals designate corresponding parts throughout the several views.

DETAILED DESCRIPTION

Figure 1:
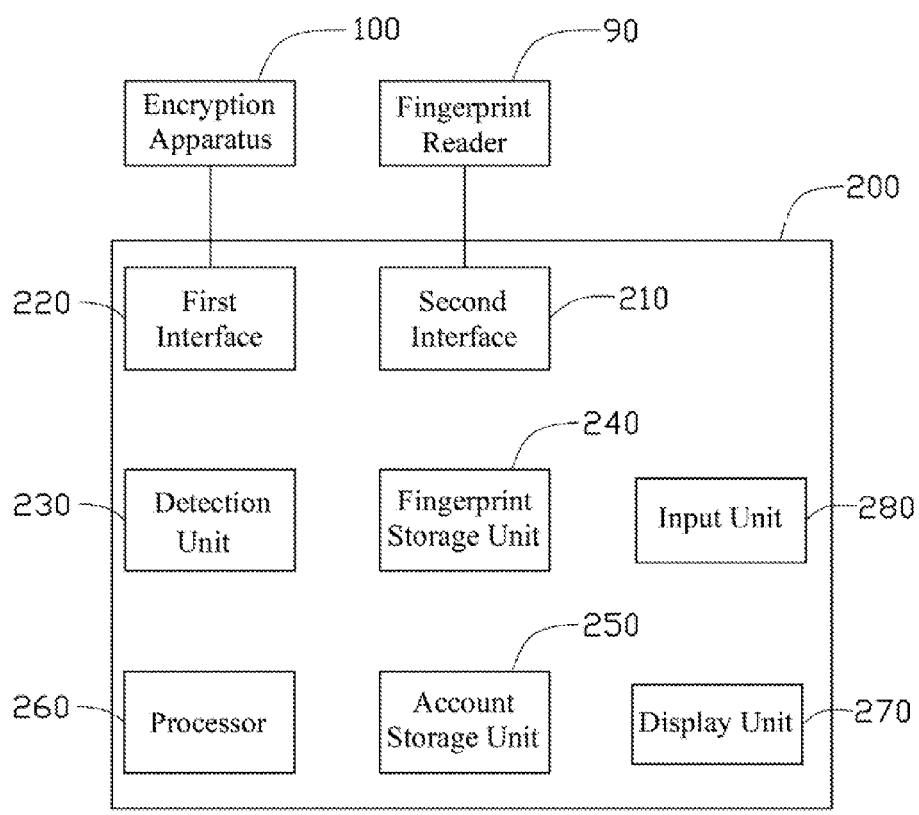
FIG. 1 is a block diagram of a computer with a security apparatus in accordance with an exemplary embodiment.

Referring to FIG. 1, a computer system includes a computer 200, a security apparatus 100, and a fingerprint reader 90.

The computer 200 includes a first interface 220, a second interface 210, a display unit 270, an input unit 280, a fingerprint storage unit 240, an account storage unit 250, a detection unit 230, and a processor 260. In the present embodiment, the display unit 270 is a LCD monitor, and the input unit 280 is a keyboard. The security apparatus 100 and the fingerprint reader 90 can be connected to the computer 200 through the first interface 220 and the second interface 210, respectively. In the present embodiment, the first interface 220 and the second interface 210 are USB interfaces.

The fingerprint storage unit 240 stores fingerprint information input by a user using the fingerprint reader 90, and the fingerprint information is unmodifiable in the fingerprint storage unit 240. In the present embodiment, the fingerprint storage unit 250 is a One Time Programmable Read-Only Memory (OTPROM). The account storage unit 250 stores account information input by the user using the input unit 280. In the present embodiment, the account storage unit 250 is an Electrically Erasable Programmable Read Only Memory (EEPROM), and the account can be composed of numbers and English letters. The account is modifiable, but multiple accounts are not allowed to be stored in the account storage unit 250.

The detection unit 230 detects the status of the first interface 220, and can generate an abnormal signal when the security apparatus 100 is disconnected from the first interface 220. The processor 260 shuts down the computer 200 when receiving the abnormal signal from the detection unit 230.

Figure 2:
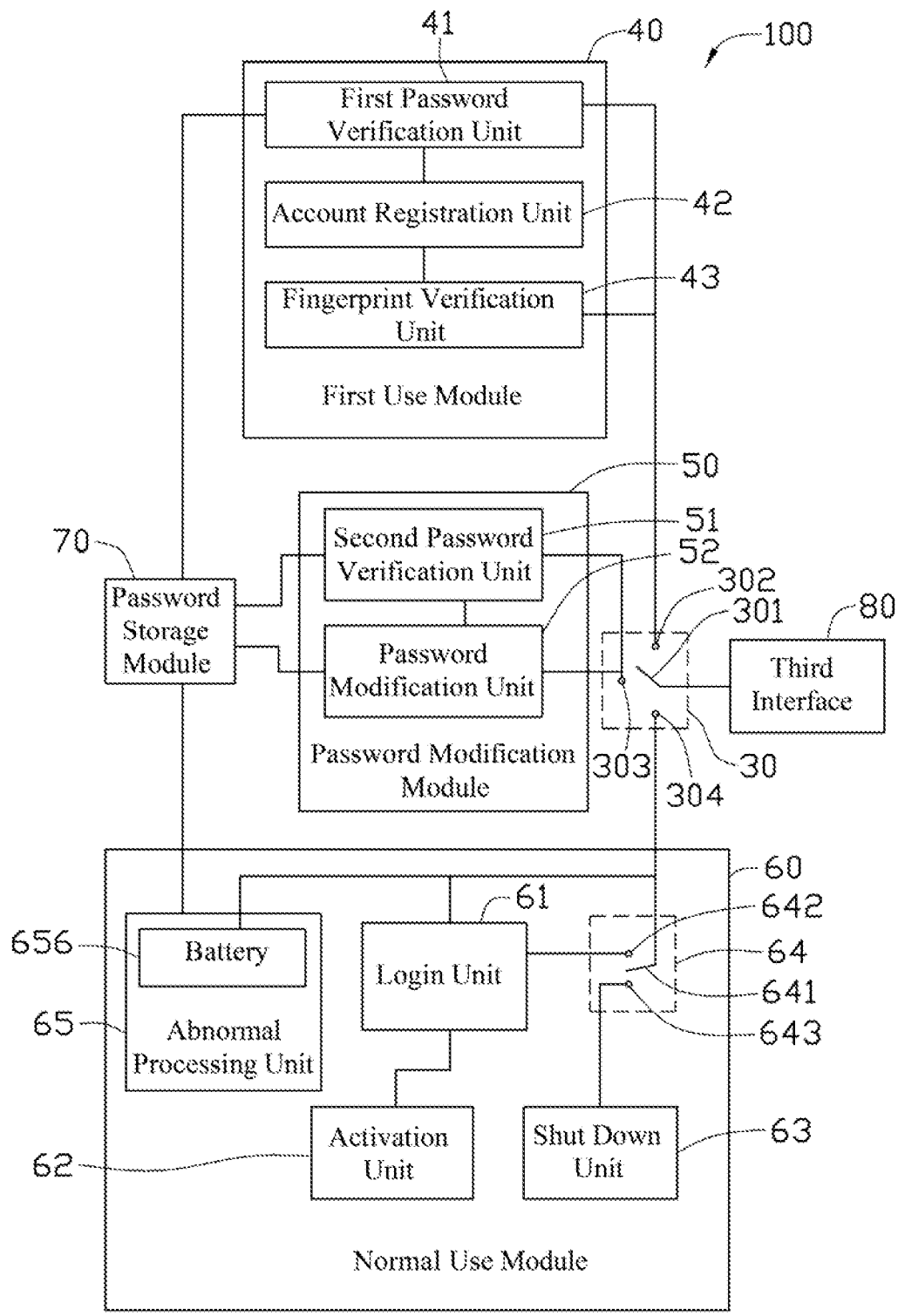
FIG. 2 is a schematic diagram of the security apparatus in accordance with an exemplary embodiment.

Referring to FIG. 2, the security apparatus 100 includes a third interface 80, a password storage module 70, a first use module 40, a password modification module 50, a normal use module 60, a first switch 30, and a second switch 64. The security apparatus 100 is connected to the first interface 220 of the computer 200 through the third interface 80.

Figure 3:
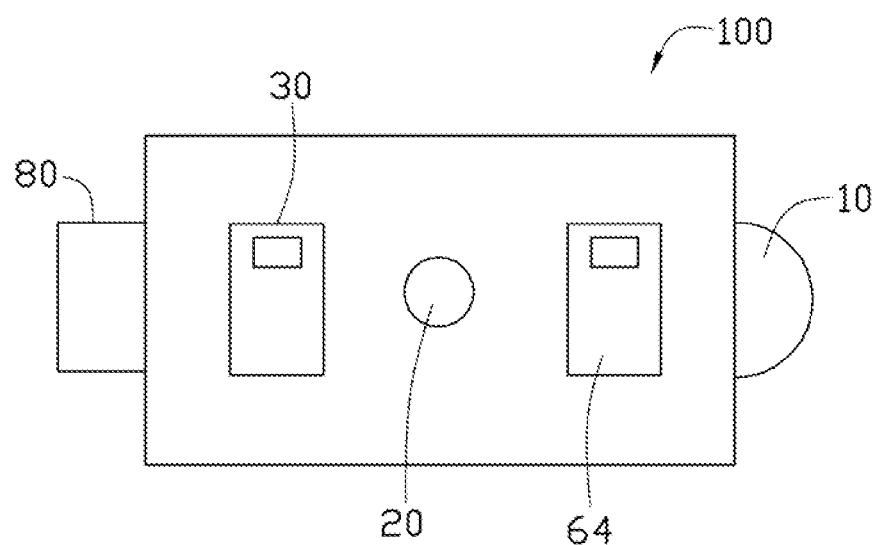
FIG. 3 is a schematic front view of the security apparatus of FIG. 3.

Referring to FIG. 3, in one embodiment, the physical size of the security apparatus 100 is similar to a traditional USB drive. The third interface 80 is a USB interface, and the first switch 30 and the second switch 64 are sliding switches. The security apparatus 100 further includes a light indicator 10 and a buzzer 20 to indicate the status of the security apparatus 100.

The password storage module 70 of the security apparatus 100 stores password information. In the present embodiment, the password storage module 70 is an Electrically Erasable Programmable Read-Only Memory (EEPROM). The first switch 30 includes three fixed inputs or terminals (fixed ends 302, 303, and 304), and a wiper or connecting terminal (movable end 301) which allows the third interface 80 to be connected to the first use module 40, or to the password modification module 50, or to the normal use module 60. In other embodiments, the first switch 30 can be another type of switch unit, like a triple throw switch.

The first use module 40 includes a first password verification unit 41, an account registration unit 42, and a fingerprint verification unit 43. The first password verification 41 determines whether the password input by the user is identical to the password information stored in the password storage module 70. The account registration unit 42 controls the display unit to allow the user to register an account and a fingerprint initially, and stores the account and the fingerprint in the account storage unit 250 and the fingerprint storage unit 240 of the computer 200, respectively. The fingerprint verification unit 43 determines whether the fingerprint input by the user is identical to the fingerprint information stored in the fingerprint storage unit 240.

Figure 4:
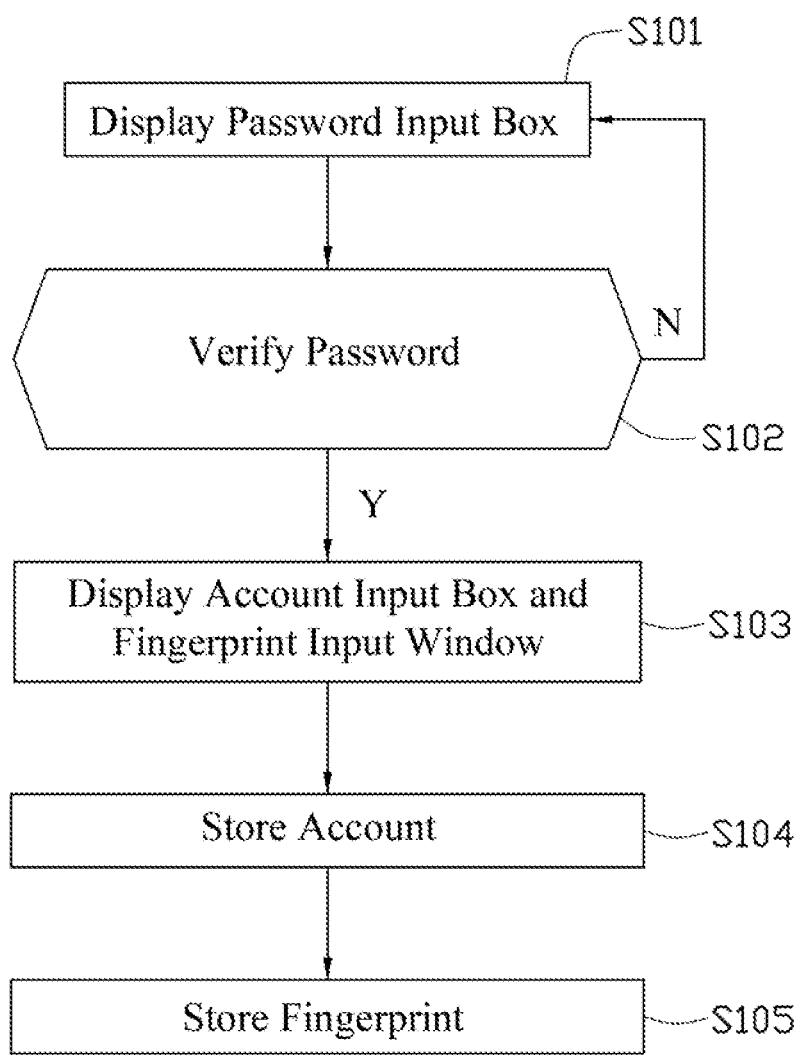
FIG. 4 is a flowchart of an account registration process of a security method in accordance with an exemplary embodiment.

When using the security apparatus 100 for the first time, the security apparatus 100 and the fingerprint reader 90 are connected with the computer 200. The movable end 301 of the security apparatus 100 is connected with the fixed end 302 to connect the first use module 40 to the third interface 80 to access the computer 200. Referring to FIG. 4, the first password verification unit 41 controls the display unit 270 of the computer 200 to display a password input box for inputting a first password (S101). The first password verification unit may then read the password information stored in the password storage module 70, and determines whether the first password input by the user is identical to the password information (S102). If the two passwords are not identical, the first password verification unit 41 controls the display unit 270 to display the password input box again; if the two passwords are identical, the account registration unit 42 controls the display unit 270 to provide an account input box and a fingerprint input window for inputting a first account and a first fingerprint (S103). The account registration unit 42 stores the first account in the account storage unit 250 (S104), and stores the fingerprint in the fingerprint storage unit 240 of the computer 200 (S105). In the present embodiment, the password information stored in the password storage module 70 is a default password when using the security apparatus 100 for the first time, and can be modified using the password modification module 50.

Figure 5:
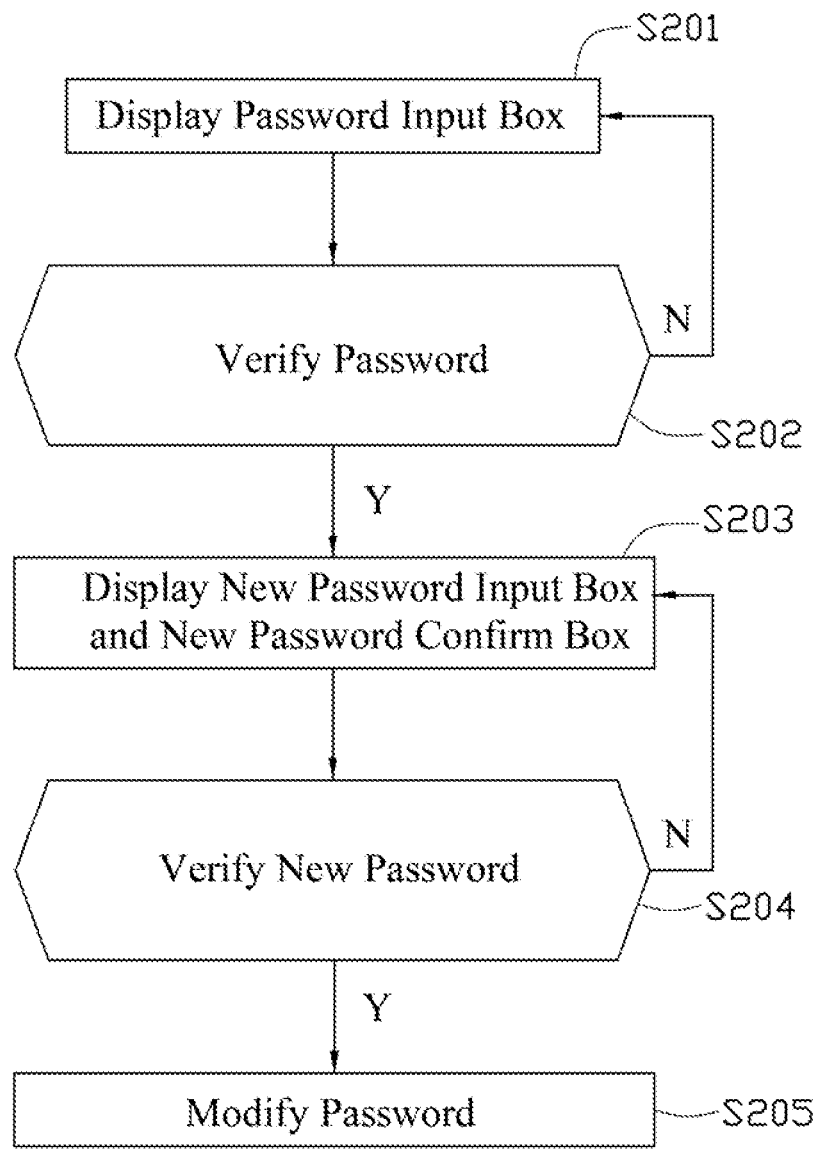
FIG. 5 is a flowchart of a password modifying process of a security method in accordance with an exemplary embodiment.
Figure 6:
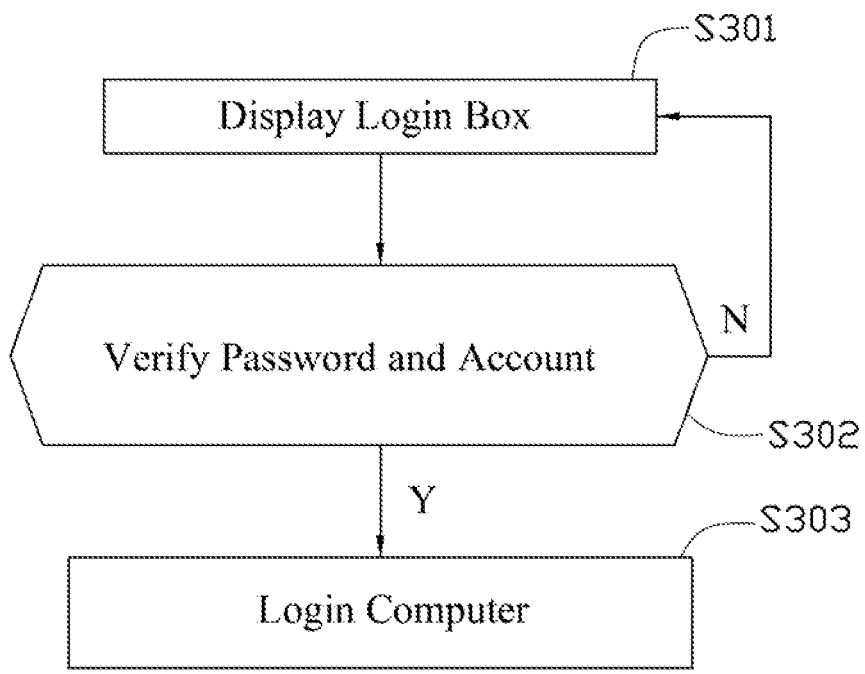
FIG. 6 is a flowchart of a computer login process of a security method in accordance with an exemplary embodiment.
Figure 7:
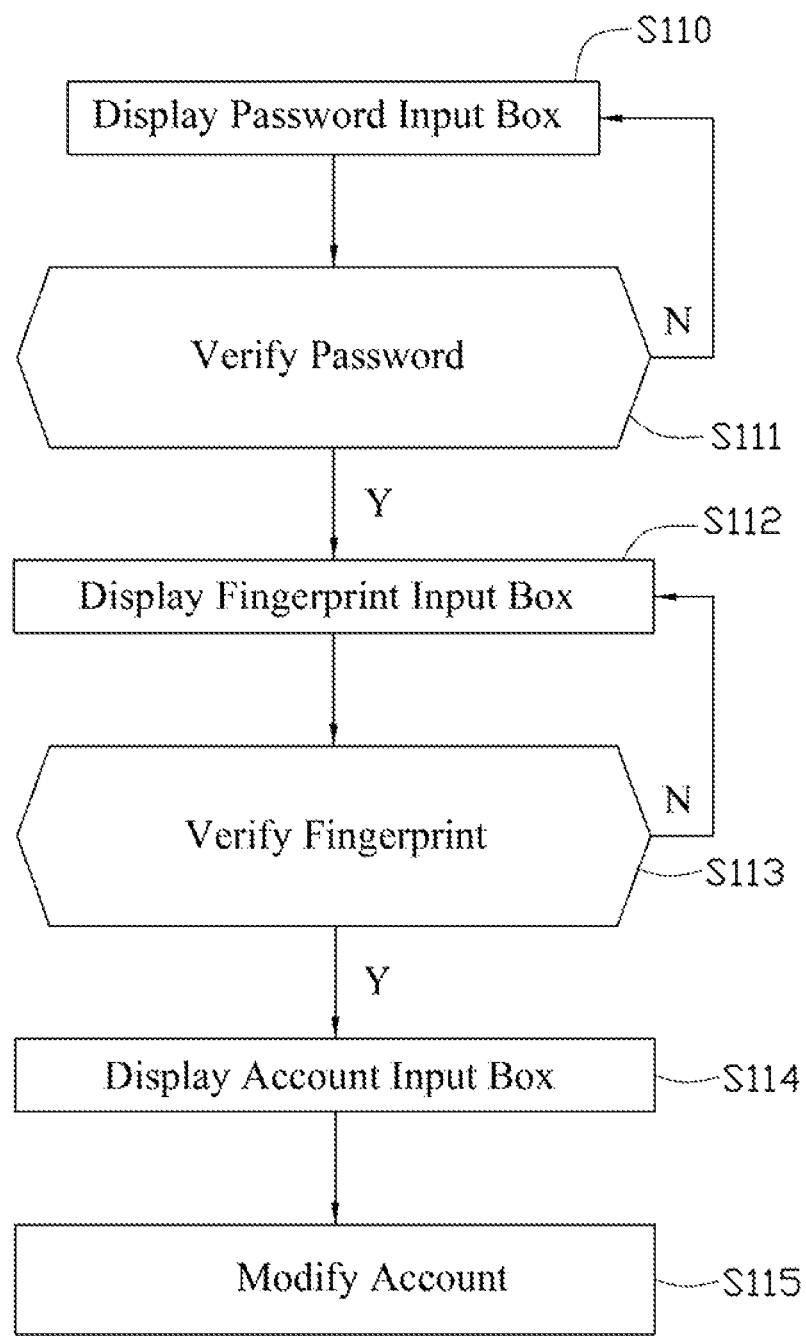
FIG. 7 is a flowchart of an account modifying process of a security method in accordance with an exemplary embodiment.

The password modification module 50 includes a second password verification unit 50 and a password modification unit 52. When modifying the password information stored in the password storage module 70, the security apparatus 100 is connected to the computer 200 and the movable end 301 is connected with the fixed end 303 of the first switch 30 to connect the password modification module 50 to the third interface 80. Referring to FIG. 5, the second password verification unit 50 controls the display unit 270 to display the password input box for inputting a second password (S201). The second password verification module 51 determines whether the second password is identical to the password information stored in the password storage module 70 (S202). If the two passwords are not identical, the second password verification unit 50 controls the display unit 270 to display the password input box again; if the two passwords are identical, the password modification unit 52 controls the display unit 270 to display a new password input box for inputting a third password and a new password confirm box for inputting the third password again (S203). The password modification unit 52 determines whether the third password input in the new password input box and the new password confirm box are identical (S204). If the passwords are not identical, the new password input box and the new password confirm box are displayed again (S203); if the two password information are identical, the password modification unit 52 stores the third password to replace the password information stored in the password storage module 70 (S205).

The normal use module 60 includes a second switch 64, a login unit 61, an activation unit 62, a shut down unit 63, and an abnormal processing unit 65. The second switch 64 includes two fixed inputs or terminals (fixed ends 642 and 643), and a wiper or connecting terminal (movable end 641) which allows the first switch 30 to be connected to the login unit 61 or the shut down unit 63. In other embodiments, the second switch 64 can be another type of switch unit, like a triple double switch.

Before accessing and using the computer 200, the security apparatus 100 is connected to the computer 200 and the movable end 301 is connected with the fixed end 304 of the first switch 30 to connect the normal use module 60 to the third interface 80. The login unit 61 controls the display unit 70 to display the account input box and the password input box for inputting a second account and a fourth password. The login unit 61 determines whether the second account and the fourth password are identical to the account information stored in the account storage unit 240 and the password information stored in the password storage module 70. If the second account or the fourth password are not identical to the account information stored in the account storage unit 240 and the password information stored in the password storage module 70, the login unit 61 controls the display unit 70 to display the account input box and the password input box again; if the second account and the fourth password are identical to the account information stored in the account storage unit 240 and the password information stored in the password storage module 70, the login unit 61 generates an activation command to the activation unit 62; The activation unit 62 allows the computer 200 to boot up when an activation command has been issued. The login unit 61 further generates a first control signal to the light indicator 10 when the second account and the fourth password are not identical to the account information stored in the account storage unit 240 and the password information stored in the password storage module 70, to control the light indicator 10 to emit a first light color, and generates a second control signal to the light indicator 10 when the second account and the fourth password are identical to the account information stored in the account storage unit 240 and the password information stored in the password storage module 70 to control the light indicator 10 to emit a second light color. In the present embodiment, the light indicator 10 is a light-emitting diode (LED), and the first color and the second color are red and green, respectively.

Before shutting down the computer 200, the movable end 641 is connected with the fixed end 643 to connect the shut down unit 63 to the third interface 80. The shut down unit 63 generate a shut down command to the computer 200 to allow the computer 200 to shut itself down. In another embodiment, the shut down unit 63 shuts down the computer 200 when the shut down unit 63 is connected to the third interface 80.

The abnormal processing unit 65 includes a battery 656 which is charged when the security apparatus 100 is connected with the computer 200, and supplies power to the security apparatus 100 when the security apparatus 100 is disconnected from the computer 200. When the security apparatus 100 is disconnected from the computer 200 in operation without shutting down the computer 200, the abnormal processing unit 65 controls the buzzer 20 to buzz and lockdown the login unit 61 to stop the user from activating the computer 200. The abnormal processing unit 65 unlocks the login unit 61 so as to allow the login unit 61 to activate the computer 200 until the password information in the password storage module 70 has been modified using the password modification module 50. In the present embodiment, when the security apparatus 100 is disconnected from the computer 200 in operation without shutting down the computer 200, the computer 200 is shut down by the processor 260 which receiving the abnormal signal from the detection unit 230.

When the security apparatus 100 is broken or missing, another security apparatus 100 and the fingerprint reader 90 are connected with the computer 200 to register a new account to replace the account information stored in the account storage unit 250. The movable end 301 of the security apparatus is connected with the fixed end 302 to connect the first use module 40 to the third interface 80. The first password verification unit 41 controls the display unit 270 to display the password input box for inputting the password information (S110). The first password verification unit 41 determines whether the password information is identical to the password information stored in the password storage module 70 (S111), if the two password information are not identical, the password input box is displayed again; if the two password information are identical, the fingerprint verification unit 43 to controls the display unit 270 to display the fingerprint input window for inputting a second fingerprint (S112). The fingerprint verification unit 43 determines whether the second fingerprint and the fingerprint information stored in the fingerprint storage unit 240 are identical (S113). If the two fingerprints are not identical, the fingerprint input window is displayed again; if the two fingerprints are identical, the finger print verification unit 43 controls the account registration unit 42 to control the display unit 270 to display the account registration box, and the second account is inputted and is used to replace the first account.

Therefore, the computer 200 needs to be connected with the security apparatus 100 before the operating system can run because the computer 200 is locked when the security apparatus 100 is taken away. The user can use the new security apparatus 100 to register the new account to access the computer 200 while anyone else cannot register the new account without inputting the original fingerprint.

Although the present disclosure has been specifically described on the basis of this exemplary embodiment, the disclosure is not to be construed as being limited thereto. Various changes or modifications may be made to the embodiment without departing from the scope and spirit of the disclosure.

What is claimed is:

1. A computer system, comprising:
a computer comprising a first interface, a second interface, an account storage unit, and a fingerprint storage unit;
a fingerprint reader connected to the computer through the first interface for inputting fingerprint information; and
a security apparatus connected to the computer through the second interface, comprising a password storage module, a first use module, a password modification module, and a normal use module;
wherein the password storage module stores password information; the first use module allows a first account and a first fingerprint to be stored in the account storage unit and the fingerprint storage unit, respectively, when determining a first password input is identical to the password information stored in the password storage module; the first use module replaces the first account with a second account when determining a second fingerprint is identical to the first fingerprint stored in the fingerprint storage unit; the password modification module allows the password information stored in the password storage module to be replaced with a second password; the normal use module allows the computer to be activated or shut down, and locks the normal use module to prevent the computer to be activated when the security apparatus is disconnected from the computer which is not shut down;
wherein the security apparatus comprises a first switch which selectively connect the second interface to the first use module, the password modification module, or the normal use module.

2. The computer system as claimed in claim 1, wherein the first switch comprises a movable end and three fixed end corresponding to the second interface, the first use module, the password modification module, and the normal use module, respectively.

3. The computer system as claimed in claim 1, wherein the normal use module comprises a login unit, an activation unit, and a shut down unit; the login unit determines whether a third account and a third password are identical to the first account stored in the account storage unit and the password information stored in the password storage module; the login unit generates an activation command to the activation unit when the third account and the third password are identical to the first account stored in the account storage unit and the password information stored in the password storage module; the shut down unit allows the computer to shut down.

4. The computer system as claimed in claim 3, wherein the normal use module further comprises an abnormal processing module; the abnormal processing module locks the login unit of the normal use module when the security apparatus is disconnected from the computer in operation.

5. The computer system as claimed in claim 4, wherein the abnormal processing module comprises a battery to supply power to the security apparatus, and the battery is charged when the security apparatus is connected to the computer.

6. The computer system as claimed in claim 5, wherein the security apparatus comprises a buzzer to buzz when the security apparatus is being disconnected from the computer in operation.

7. The computer system as claimed in claim 4, wherein the abnormal processing module unlocks the login module when the password information stored in the password storage unit is replaced by a fourth password.

8. The computer system as claimed in claim 5, wherein the security apparatus comprises a light indicator which emits a first light color when the third account and the third password are identical to the account information stored in the account storage unit and the password information stored in the password storage module, or emits a second light color when the third account and the third password are not identical to the account information stored in the account storage unit or the password information stored in the password storage module.

9. The computer system as claimed in claim 3, wherein the security apparatus comprises a second switch; the second switch selectively connects the second interface to the login unit or the shut down unit.

10. The computer system as claimed in claim 9, wherein the second switch comprises a movable end and two fixed end corresponding to the second interface, the login unit and the shut down unit, respectively.

11. The computer system as claimed in claim 9, wherein the shut down unit shuts down the computer when the second switch connects the second interface to the login unit.

12. The computer system as claimed in claim 1, wherein the first use module comprises a first password verification unit, an account registration unit, and a fingerprint verification unit; the first password verification unit determines whether the first password is identical to the password information stored in the password storage module; the account registration unit stores the first account and the first fingerprint in the account storage unit and the fingerprint storage unit, respectively, and replaces the first account stored in the account storage with the second account when the fingerprint verification unit determines the second fingerprint is identical to the first fingerprint stored in the fingerprint storage unit.

13. The computer system as claimed in claim 1, wherein the password modification module comprises a second password verification unit and a password modification unit; the second password verification unit determines whether the first password is identical to the password information stored in the password storage module; the password modification unit stores the second password to replace the password information stored in the password storage module when the second password and the password information are identical.

14. The computer system as claimed in claim 1, wherein the first fingerprint stored in the fingerprint storage unit is unmodifiable.

15. The computer system as claimed in claim 1, wherein the computer comprises a detection unit for detecting a connection between the computer and the security apparatus, and generates an abnormal signal when the security apparatus is disconnected from the computer to a processor of the computer to shut down the computer.

16. A computer system, comprising:
a computer comprising a first interface, a second interface, an account storage unit, and a fingerprint storage unit;
a fingerprint reader connected to the computer through the first interface for inputting fingerprint information; and
a security apparatus connected to the computer through the second interface, comprising a password storage module, a first use module, a password modification module, and a normal use module;

wherein the password storage module stores password information; the first use module allows a first account and a first fingerprint to be stored in the account storage unit and the fingerprint storage unit, respectively, when determining a first password input is identical to the password information stored in the password storage module; the first use module replaces the first account with a second account when determining a second fingerprint is identical to the first fingerprint stored in the fingerprint storage unit; the password modification module allows the password information stored in the password storage module to be replaced with a second password; the normal use module allows the computer to be activated or shut down, and locks the normal use module to prevent the computer to be activated when the security apparatus is disconnected from the computer which is not shut down;

wherein the first use module comprises a first password verification unit, an account registration unit, and a fingerprint verification unit; the first password verification unit determines whether the first password is identical to the password information stored in the password storage module; the account registration unit stores the first account and the first fingerprint in the account storage unit and the fingerprint storage unit, respectively, and replaces the first account stored in the account storage with the second account when the fingerprint verification unit determines the second fingerprint is identical to the first fingerprint stored in the fingerprint storage unit.

17. The computer system as claimed in claim 16, wherein the password modification module comprises a second password verification unit and a password modification unit; the second password verification unit determines whether the first password is identical to the password information stored in the password storage module; the password modification unit stores the second password to replace the password information stored in the password storage module when the second password and the password information are identical.

* * * * *